United States Patent Office 3,230,234
Patented Jan. 18, 1966

3,230,234
PROCESS FOR THE PREPARATION OF 2,3-DIHYDRO-1H-CYCLOHEPTA [b] PYRROLE-2,8-DIONE DERIVATIVES AND PRODUCTS THEREOF
Genshun Sunagawa and Nobuo Soma, Tokyo, Japan, assignors to Sankyo Company, Limited, Tokyo, Japan
No Drawing. Filed June 21, 1963, Ser. No. 289,713
Claims priority, application Japan, May 6, 1960, 35/23,587
5 Claims. (Cl. 260—326.5)

This application is a continuation-in-part of our co-pending application Serial No. 107,032, filed May 2, 1961, now abandoned.

This invention relates to a process for preparing 2,3-dihydro-1H-cyclohepta[b]pyrrole-2,8-dione derivatives.

More particularly, it relates to 2,3-dihydro-1H-cyclohepta[b]pyrrole-2,8-dione derivatives having the general formula

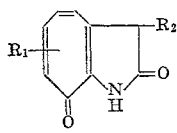

wherein $R_1$ is a member selected from the group consisting of hydrogen atom, halogen atom such as chlorine or bromine, nitro and alkyl radicals containing 1 to 5 carbon atoms such as methyl, ethyl, propyl or isopropyl, and $R_2$ a member selected from the group consisting of cyano and alkoxycarbonyl radicals such as methoxycarbonyl, ethoxycarbonyl or propoxycarbonyl radical.

The 2,3-dihydro-1H-cyclohepta[b]pyrrole-2,8-dione derivatives having the above-described Formula I produced according to the process of this invention are novel compounds unknown in the prior art and useful as intermediates for the preparation of various compounds valuable as medicines. For example, 3-ethoxycarbonyl-2,3-dihydro-1H-cyclohepta[b]pyrrole-2,8-dione may be successively subjected to saponification and decarboxylation, halogenation and treatment with an alkali to form 2-halogeno-cyclohepta[b]pyrrole-8(1H)-one, which may be converted by reaction with sodium amide followed by reaction with halogeno alkylamines of the general formula X—(CH$_2$)$_n$—Y wherein X represents a halogen atom, Y is a di(lower alkyl)amino radical such as dimethylamino or diethylamino radical and $n$ is an integer from 1 to 5 to compounds valuable as the hypotensive agent having the general formula

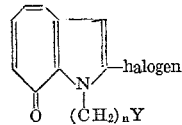

wherein Y and $n$ have the same meaning as above.

It is an object of this invention to provide a process for preparing novel 2,3-dihydro-1H-cyclohepta[b]pyrrole-2,8-dione derivatives having the above Formula I useful as intermediates for the preparation of compounds valuable as medicines.

According to the present invention, the abovementioned 2,3-dihydro-1H-cyclohepta[b]pyrrole-2,8-dione derivatives may be produced by reacting 2-amino-3-halogenotropones having the general formula

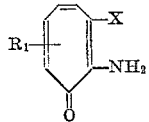

wherein $R_1$ has the same meaning as above and X is a halogen atom with active methylene compounds having the general formula $$R_3—CO—CH_2—R_2$$

wherein $R_3$ represents an alkoxy radical and $R_2$ has the same meaning as above.

In carrying out the reaction, alkali metals such as sodium or potassium, alkali metal hydrides such as sodium or potassium hydrides, alkali metal amides such as sodium or potassium amide and alkali metal alkoxides such as sodium ethoxide or potassium t-butoxide may be used as the condensing agent. The reaction is carried out in organic solvents such as alcohols, dioxane, benzene or toluene. It is preferable to carry out the reaction at temperatures at which the solvent used is refluxed or at temperatures between about 80° C. and about 110° C. in a sealed vessel. When the active methylene compound is used in the form of its alkali metal salt no condensing agent is required to exist.

Examples of compounds used as the 2-amino-3-halogenotropone starting material are 2-amino-3-bromotropone, 2-amino-3-bromo-5-methyltropone, 2-amino-3-bromo-6-isopropyltropone, 2-amino-3,5-dibromotropone, 2-amino-3,5-dibromo-6-isopropyltropone, 2-amino-3-chloro-4-isopropyltropone and the like.

Examples of compounds used as the active methylene compound are dimethyl malonate, diethyl malonate, ethyl cyanoacetate and the like.

After completion of the reaction, the reaction product is isolated from the reaction mixture by one of the conventional procedures. For example, after completion of the reaction the reaction mixture is concentrated, the concentrate is added to water followed by neutralization with mineral acid such as hydrochloric or sulfuric acid and then the precipitated product is isolated by filtration. Alternatively, after the neutralization with mineral acid as above the resulting mixture is extracted with water-immiscible organic solvent such as ether or benzene and the solvent is removed from the extract to give the desired product.

Examples of the 2,3-dihydro-1H-cyclohepta[b]pyrrole-2,8-dione derivatives obtained in the above-described way are 3 - ethoxycarbonyl-2,3-dihydro-1H-cyclohepta[b]pyrrole - 2,8-dione, 3-ethoxycarbonyl-5-bromo-2,3-dihydro-1H - cyclohepta[b]pyrrole-2,8-dione, 3-ethoxycarbonyl-6-isopropyl - 2,3 - dihydro-1H-cyclohepta[b]pyrrole-2,8-dione, 3-cyano-2,3-dihydro-1H-cyclohepta[b]pyrrole-2,8-dione, 3 - cyano-5-bromo-2,3-dihydro-1H-cyclohepta[b]pyrrole - 2,8-dione, 3-cyano-6-isopropyl-2,3-dihydro-1H-cyclohepta[b]pyrrole-2,8-dione and the like.

Examples of this invention will be illustrated below. However, it is to be understood that the following examples are given for illustration but not by way of limitation and that many changes may be made with regard to materials and process conditions without affecting in any way the scope and spirit of this invention as recited in the appended claims.

*Example 1*

To a solution of 0.23 g. of metallic sodium in 8 cc. of ethanol are added 1.6 g. of diethyl malonate and 1.0 g. of 2-amino-3-bromotropone. The mixture is heated in a sealed tube at 110° C. for 4 hours. After cooling, the crystals precipitated are separated by filtration and added into water. Hydrochloric acid is added in the resulting mixture to pH 1.0 followed by separation of crystals by filtration. Recrystallization from ethanol gives 3-ethoxycarbonyl - 2,3-dihydro-1H-cyclohepta[b]pyrrole-2,8-dione as yellow crystals melting at 218–219° C.; yield 0.5 g.

Example 2

To a solution of 0.57 g. of metallic sodium in 15 cc. of ethanol are added 2.82 g. of ethyl cyanoacetate and 2.5 g. of 2-amino-3-bromotropone. The mixture is heated in a sealed tube at 85–95° C. for 3 hours. The crystals precipitated are separated by filtration and added to water. The resulting mass is mixed with hydrochloric acid to pH 1.5 followed by separation of crystals by filtration. The crystals are dissolved in 5% aqueous solution of sodium carbonate and to the solution is added hydrochloric acid to precipitate purified yellow crystals of 3-cyano-2,3-dihydro-1H-cyclohepta[b]pyrrole-2,8-dione, M.P. above 250° C.; yield 2.0 g.

Example 3

To a solution of 0.23 g. of metallic sodium in 10 cc. of ethanol are added 1.2 g. of ethyl cyanoacetate and 1.2 g. of 2-amino-3-bromo-6-isopropyltropone. The mixture is heated in a sealed tube at 100° C. for 4 hours. After cooling the crystals precipitated are separated by filtration and added to water. The resulting mass is mixed with hydrochloric acid to pH 1.0 followed by separation of crystals by filtration. The crystals are dissolved in 5% aqueous solution of sodium carbonate followed by addition of hydrochloric acid to precipitate purified crystals. Yellow crystals of 3-cyano-6-isopropyl-2,3-dihydro-1H-cyclohepta[b]pyrrole-2,8-dione, M.P. above 250° C. are obtained; yield 0.5 g.

Example 4

To a solution of 0.15 g. of metallic sodium in 10 cc. of ethanol are added 0.9 g. of ethyl cyanoacetate and 1.0 g. of 2-amino-3,5-dibromotropone. The mixture is heated in a sealed tube at 90° C. for 4 hours. After cooling, the crystals precipitated are separated by filtration and added in water. After adjusting pH to 1.0, the crystals precipitated are separated by filtration and dissolved in aqueous solution of sodium carbonate. On making the solution acid, purified crystals are precipitated. Yellow crystals of 3 - cyano-5-bromo-2,3-dihydro-1H-cyclohepta[b]pyrrole-2,8-dione, M.P. above 250° C., are obtained; yield 0.2 g.

Example 5

A mixture of 5.0 g. of 3-ethoxycarbonyl-2,3-dihydro-1H-cyclohepeta[b]pyrrole-2,8-dione and 25 cc. of concentrated hydrobromic acid is heated under reflux for 3 hours. The reaction mixture is concentrated, diluted with water and neutralized with sodium hydroxide. Crystals thus precipitated are separated by filtration and washed with water to give 3.3 g. of 2,3-dihydro-1H-cyclohepta[b]pyrrole-2,8-dione.

The product is heated in 45 cc. of phosphorus oxychloride at 110° C. for 3 hours. The reaction product is poured into ice water, neutralized with sodium hydroxide and extracted with benzene. The benzene extract is purified by passing through an alumina column to give 4.0 g. of 2,8-dichlorocyclohepta[b]pyrrole.

A solution of the product in 80 cc. of 1:1 mixture of 2 N-sodium hydroxide and ethanol is heated under reflux for 3 hours. The reaction product is neutralized with hydrochloric acid, followed by extraction with chloroform. The solvent is removed by distillation from the extract to give 3.0 g. of 2-chlorocyclohepta[b]pyrrole-8(1H)-one.

The product is heated in 100 cc. of toluene in the presence of 0.7 g. of potassium under reflux for 3 hours to convert the former to the potassium salt. To the reaction mixture is added 2.5 g. of dimethylaminopropyl chloride and the resulting mixture is heated under reflux for 8 hours. Insoluble mass is filtered off from the reaction mixture and the filtrate is concentrated. The residue is dissolved in chloroform and the solution is then passed through an alumina column for purification to give 3.3 g. of 1-(3-dimethylaminopropyl)-2-chlorocyclohepta[b]pyrrole-8(1H)-one as an oily substance. Dihydrochloride of the substance has a melting point of 175° C. with decomposition.

Example 6

Following the procedure in Example 5, using 3.0 g. of 3 - cyano-2,3-dihydro-1H-cyclohepta[b]pyrrole-2,8-dione as the starting material, in place of 3-ethoxycarbonyl-2,3-dihydro-1H-cyclohepta[b]pyrrole-2,8-dione and 100 cc. of concentrated hydrobromic acid in place of 25 cc. of the said acid produces 1.1 g. of the same product as in Example 5.

While a specific embodiment of the invention has been shown and described in detail to illustrate the application of the principles of the invention, it will be understood that this invention may be embodied otherwise without departing from such principles.

What is claimed is:

1. A compound of the formula

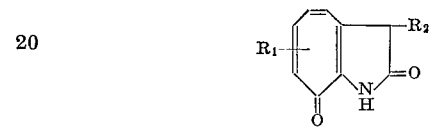

wherein $R_1$ is a member selected from the group consisting of hydrogen, chlorine, bromine, nitro and lower alkyl of from 1 to 5 carbon atoms and $R_2$ is selected from the group consisting of cyano and alkoxycarbonyl of from 1 to 3 carbon atoms on the alkoxy moiety.

2. A process for preparing a compound having the formula

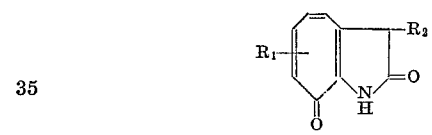

wherein $R_1$ is a member selected from the group consisting of hydrogen, chlorine, bromine, nitro and lower alkyl of from 1 to 5 carbon atoms and $R_2$ is selected from the group consisting of cyano and alkoxycarbonyl of 1 to 3 carbon atoms on the alkyl moiety which comprises reacting a compound having the formula

wherein $R_1$ has the same meaning as above and X is a member selected from the group consisting of chlorine and bromine with a compound having the formula

wherein $R_3$ represent alkoxy of from 1 to 3 carbon atoms and $R_2$ is a member selected from the group consisting of cyano and alkoxycarbonyl of from 1 to 3 carbon atoms on the alkoxy moiety in the presence of a condensing agent.

3. 1-(3-dimethylaminopropyl) - 2 - chlorocyclohepta[b]-pyrrole-8(1H)-one.

4. A process as claimed in claim 2, wherein said condensing agent is selected from the group consisting of alkali metals, alkali metal hydrides, alkali metal amides and alkali metal alkoxides.

5. A process as claimed in claim 2, wherein said reaction is carried out in a sealed vessel in an organic solvent and at a temperature of about 80–110° C.

References Cited by the Examiner

Cram et al.: Organic Chemistry, McGraw-Hill Book Co., Inc., New York (1959), pp. 314–328.

NICHOLAS S. RIZZO, *Primary Examiner.*